United States Patent [19]

Ng

[11] Patent Number: 5,346,313
[45] Date of Patent: Sep. 13, 1994

[54] LINEAR MOTION BEARING ASSEMBLY

[75] Inventor: Alison Ng, New York, N.Y.

[73] Assignee: Thomson Industries, Inc., Port Washington, N.Y.

[21] Appl. No.: 94,514

[22] Filed: Jul. 20, 1993

[51] Int. Cl.5 .......................................... F16C 29/06
[52] U.S. Cl. ...................................................... 384/43
[58] Field of Search ........................ 384/43, 44, 45, 49

[56] References Cited

U.S. PATENT DOCUMENTS

| | | | |
|---|---|---|---|
| 3,545,826 | 12/1970 | Magee et al. | 384/43 |
| 3,767,276 | 10/1973 | Henn | 384/43 |
| 3,951,472 | 4/1976 | Schurger et al. | 384/43 |
| 3,967,865 | 7/1976 | Walter et al. | 384/43 |
| 4,512,617 | 4/1985 | Saravis et al. | 384/43 |
| 4,789,249 | 12/1988 | Mutolo | 384/43 |
| 4,815,862 | 3/1989 | Mugglestone et al. | 384/43 |
| 4,952,075 | 8/1990 | Rogers, III | 384/43 |
| 5,046,862 | 8/1991 | Ng | 384/43 |
| 5,069,555 | 12/1991 | Mugglestone et al. | 384/43 |

*Primary Examiner*—Thomas R. Hannon
*Attorney, Agent, or Firm*—Dilworth & Barrese

[57] ABSTRACT

A linear motion bearing assembly is provided and includes ball retainer structure, outer housing sleeves, a plurality of load bearing plates and plate retainer structure. The ball retainer structure of the bearing assembly can be either monolithically formed or, alternatively, assembled from multiple elements. At least a portion of axial ball tracks are formed in the outer radial faces of the ball retainer structure with each ball track having a load bearing portion providing access to a support shaft or spline. An outer housing including a pair of sleeves are provided to encompass and protect the ball retainer structure and the bearing balls contained therein. These sleeves are preferably formed of an engineering plastic. A plurality of load bearing plates, preferably of the self-aligning type, are positioned within the outer housing and serve to receive and transmit loads from the bearing balls in the load bearing portion of the ball tracks. Separate plate retainer structure is configured and positioned to directly receive and transmit loads from the load bearing plates to a carriage into which the bearing assembly is mounted.

22 Claims, 6 Drawing Sheets

LINEAR MOTION BEARING ASSEMBLY

FIELD OF THE INVENTION

The present invention relates to anti-friction linear motion bearing assemblies and, more particularly, to multiple track linear bearing assemblies for longitudinal movement along a shaft.

DESCRIPTION OF THE RELATED ART

The present invention is directed to improvements in linear motion bearing assemblies. In particular, the improvements relate to linear motion bearing assemblies of the type which support a carriage or pillow block for linear movement along a support member such as an elongated shaft or spline.

These bearing assemblies can either be of the open type or the closed type. Bearing assemblies contemplated by the present invention generally include an outer housing and a ball retainer dimensioned for insertion into the outer housing. The ball retainer defines a plurality of longitudinal planar faces each having at least one ball track in a loop configuration for containing and recirculating bearing balls. The ball tracks include open portions which facilitate load transfer from the supporting shaft to load bearing structure such as load bearing plates operatively associated with either the ball retainer or the outer housing. Return portions of the ball tracks permit continuous recirculation of the bearing balls through the ball tracks during linear motion. The ball retainer is typically formed as a monolithic element with the ball tracks integrally incorporated therein. See, U.S. Pat. No. 3,767,276 to Henn. This structure, however, is difficult to efficiently manufacture because of the complex molds required. Also, these ball retainers, prior to insertion into a mounting carriage or outer housing are necessarily open and thus exposed to ambient conditions and contaminants such as dust and dirt. Such exposure could deleteriously affect the operation and life of the bearing assembly as well as the support structure on which it moves.

The load bearing structure may be in the form of integral elements formed on an inner radial surface of the outer housing. Typical bearing assemblies utilizing load bearing structure formed in the outer housing are shown, for example, in commonly owned U.S. Pat. No. 5,046,862 to Ng, the disclosure of which is incorporated herein by reference.

In lieu of integral load bearing structure, separate load bearing plates may be utilized to transfer loads from the supporting shaft. These load bearing plates are longitudinally oriented in association with the ball retainer so as to engage at least those bearing balls in direct contact with the support shaft. These load bearing plates may also be configured to be axially self-aligning by providing structure which permits the plates to rock into and out of parallelism with the longitudinal axis of the ball retainer. See, tier example, commonly owned U.S. Pat. No. 3,545,826 to Magee et al. Individual load bearing plates may be expanded transversely so as to engage bearing balls in corresponding adjacent load bearing tracks. In this form, parallel grooves are formed in the underside of the plates to guide the bearing balls while they are in the load bearing portion of the ball tracks. See, for example, U.S. Pat. No. 3,95 1,472 to Schurger et al.

The outer housing of bearing assemblies of the type contemplated by the present invention are typically in the form of a one piece hollow steel cylinder which serves to, inter alia, retain and protect the ball retainer and bails. See, for example, U.S. Pat. Nos. 5,046,862 to Ng and 3,767,276 to Henn, discussed above. While useful, this type of outer housing greatly increases the weight and expense of the bearing assembly. Further, the incorporation of load bearing structure in the interior side walls of the outer housing requires elaborate and precise machining to accomplish.

Accordingly, it is one object of the present invention to provide a linear motion beating assembly which can be easily and efficiently manufactured.

It is another object of the present invention to provide a linear motion bearing assembly having a ball retainer and outer housing which are easily fabricated using engineering plastics.

It is a further object of the present invention to provide a low cost linear motion bearing assembly having high load bearing capacity and having self-aligning capability.

These and other highly desirable objects are accomplished by the present invention in a linear motion bearing assembly having a plurality of ball tracks and individual bearing plates arranged in a ball retainer and enclosed by a low cost outer housing which serves to protect the balls, ball tracks and load bearing plates without having to transmit loads from the bearing balls to the carriage block into which the bearing assembly is mounted.

Objects and advantages of the invention are set forth in part herein and in part will be obvious therefrom, or may be learned by practice with the invention, which is realized and attained by means of instrumentalities and combinations pointed out in the appended claims. The invention comprises the novel parts, constructions, arrangements, combinations, steps and improvements herein shown and described.

SUMMARY OF THE INVENTION

Accordingly, the present invention provides a linear motion bearing assembly for movement along a shaft. The ball retainer structure of the bearing assembly can be either monolithically formed or, alternatively, assembled from multiple elements. At least a portion of the axial ball tracks are formed in the ball retainer structure and, preferably, the complete ball tracks are formed therein. The linear motion bearing assembly further includes an outer housing having a pair of sleeves which substantially enclose all of the ball retainer structure. These sleeves are preferably formed of an engineering plastic and serve to protect the ball retainer and bearing balls contained therein from ambient contamination.

A plurality of load bearing plates are axially positioned within the outer housing and serve to receive and transmit loads from the bearing balls in the load bearing portion of the ball tracks. The load bearing plates are at least partially retained in the linear motion bearing assembly by plate retainer structure which is disposed at least partially around the ball retainer and in contact with an outer radial surface of the load bearing plates. The plate retainer structure is preferably in the form of a plate retainer ring and is configured and positioned to directly receive and transmit loads from the load bearing plates to a carriage into which the linear bearing assembly is mounted.

Preferably, the load bearing plates and/or the plate retainer structure are configured and dimensioned such that the linear motion bearing assembly is substantially self-aligning on the shaft. It is also preferred that the load bearing plates and/or the plate retainer structure be configured to effect both axial and circumferential self-alignment of the linear motion bearing assembly on the shaft.

BRIEF DESCRIPTION OF THE DRAWINGS

The accompanying drawings, referred to herein and constituting a part hereof, illustrate the preferred embodiments of the bearing assembly of the present invention and, together with the description, serve to explain the principles of the invention.

DETAILED DESCRIPTION OF PREFERRED EMBODIMENTS

Referring initially to FIGS. 1-6, there is shown a linear motion open-type bearing assembly 40 in accordance with a preferred embodiment of the present invention. The bearing assembly includes ball retainer structure, shown generally at 42, load bearing plates 44, bearing balls 46, outer housing sleeves 48, 50 and plate retainer structure 52.

Figure 1:
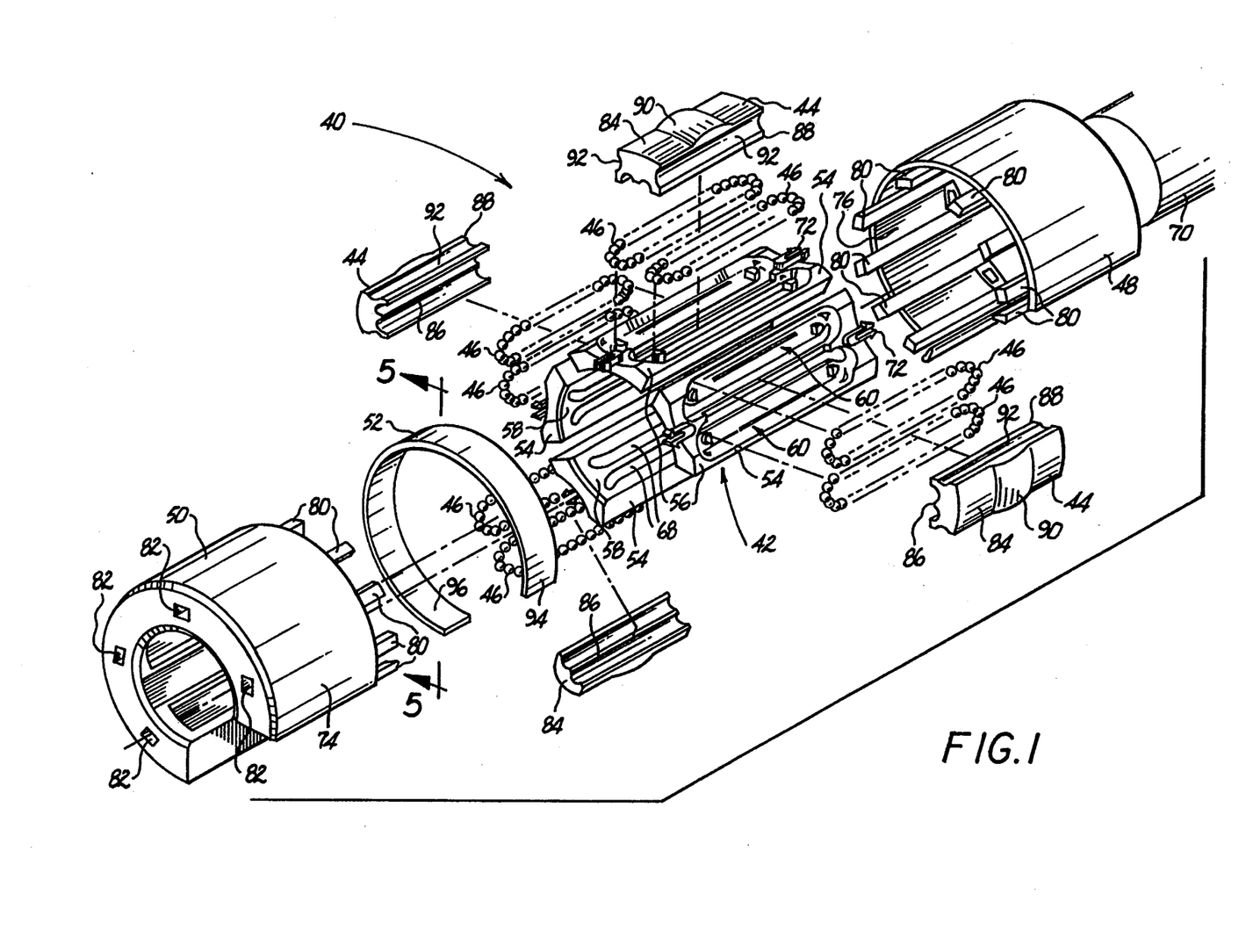
FIG. 1 is an exploded perspective view of a linear motion bearing assembly in accordance with one embodiment of the present invention.
Figure 2:
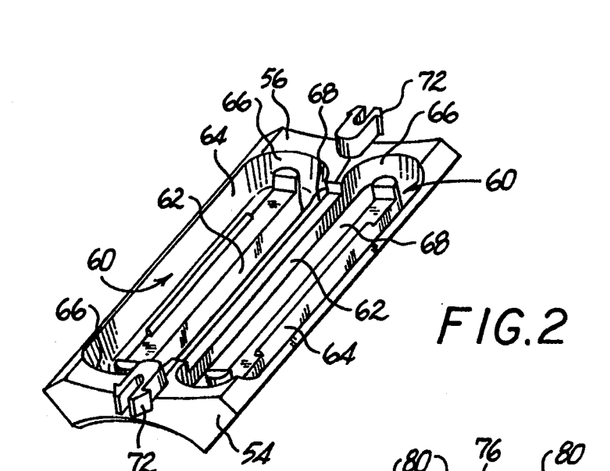
FIG. 2 is a perspective view of a ball retainer segment in accordance with the linear motion bearing assembly of FIG. 1.

In FIGS. 1-2 details of the ball retainer structure 42 are illustrated. In this embodiment of tile present invention the ball retainer structure 42 comprises four ball retainer segments 54, each operatively associated with adjacent ball retainer segments along longitudinal sides thereof to form a pentagonally shaped ball retainer structure having a bore therethrough for receiving a shalt 70. Each ball retainer segment 54 includes an outer radial surface 56 and an inner radial surface 58. Axial ball tracks 60 are formed in tile outer radial surface 56 of each ball retainer segment 54 and include load bearing portions 62, return portions 64 and turnarounds 66. The load bearing and return portions of the ball tracks in this embodiment are undercut to facilitate loading and retention of tile bearing balls 46 therein. This also eliminates the need for separate retainer structure to keep the bearing balls in the ball tracks. A longitudinal bore 68 in the inner radial surface 58 of the ball retainer segment 54 extends substantially the length of tile load bearing portions 62 and accesses support shaft 70. Although support shaft 70 is illustrated as a substantially cylindrical shaft, one skilled in the art will appreciate that support members of other configurations are within the scope of tile invention.

In this embodiment of the linear motion bearing assembly 40, the individual ball retainer segments 54 are easily molded from an appropriate engineering plastic using known materials and molding techniques. By individually forming each of the ball retainer segments, tile molding process is greatly simplified and thus results in a lower cost to produce. It is also within the scope of the present invention to fabricate the ball bearing segments from an engineering metal using known fabrication techniques.

A plurality of bearing balls 46 are disposed in the ball tracks 60 with those bearing balls 46 in the load bearing tracks 62 extending at least partially into longitudinal bores 68 to contact support shaft 70. In this embodiment of the invention, a pair of axial ball tracks 60 are formed in each outer radial surface 56 of the ball retainer segment with the corresponding load bearing tracks being oriented in substantially parallel adjacent relation. This orientation facilitates enhanced load capacity and maximizes space utilization for a more compact and efficient bearing ball arrangement. Locking structure in the form of locking clips 72 are formed on opposing longitudinal ends of each ball retainer segment 54 to facilitate assembly with outer housing sleeves 48, 50, discussed in greater detail hereinbelow.

Referring now to FIGS. 1 and 3A-C, the linear motion bearing assembly in accordance with one preferred embodiment includes a pair of outer housing sleeves 48, 50 which, when assembled serve to close and protect the exposed outer radial surfaces 56 of ball retainer structure 42. Preferably, each of sleeves 48, 50 are identical in configuration and are molded from an engineering plastic to facilitate ease of manufacture and assembly. However, one skilled in the art will appreciate that, when operating conditions or specific applications require, the sleeves may be made in differing configurations and/or from engineering metals.

The outer radial surface 74 of sleeves 48, 50 are preferably of a smooth cylindrical shape and are configured and dimensioned to fit within a mounting bore of a tool carriage (not shown). The inner radial surface 76 of sleeves 48, 50 include mounting surfaces 78 which are configured to receive at least a portion of load bearing plates 44 therein. These mounting surfaces 78 further include extension portions 80 which define a mounting space for plate retainer structure 52, described in greater detail below. Preferably, mounting surfaces 78 are recessed from outer radial surface 74 by a distance approximating the cross-sectional thickness of plate retainer structure 52. In this manner, the outer housing sleeves 48, 50 and the plate retainer structure 52 combine to form a relatively smooth and uniform outer radial surface of the linear motion bearing assembly 40. See, FIG. 6.

Figure 3A:
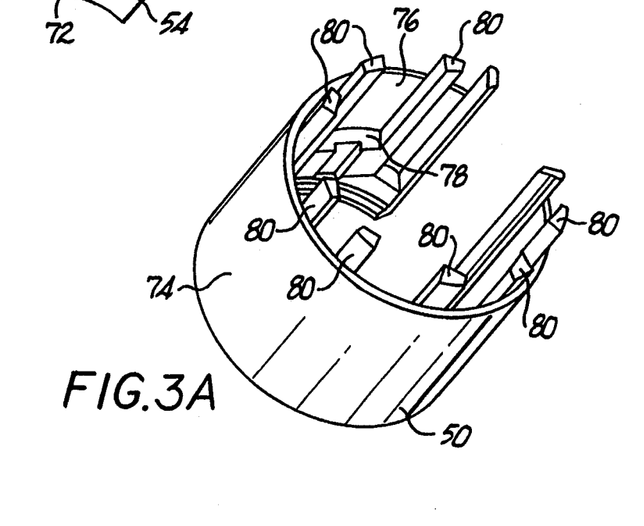
FIG. 3A is a perspective view of the sleeve portion of the outer housing of the linear motion bearing assembly of FIG. 1.
Figure 3B:
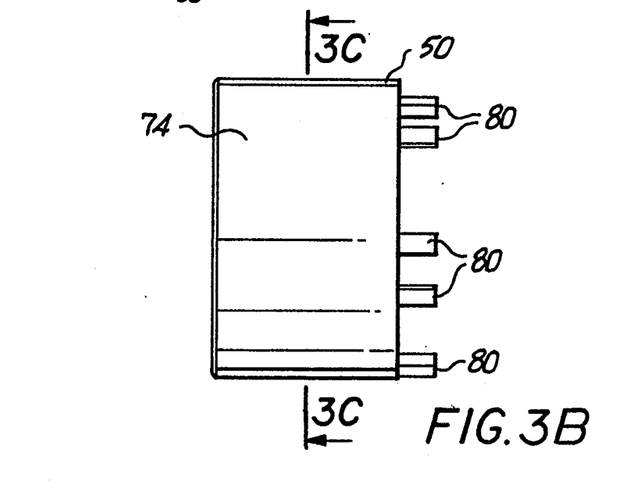
FIG. 3B is a side view of the sleeve portion of FIG. 3A.
Figure 3C:
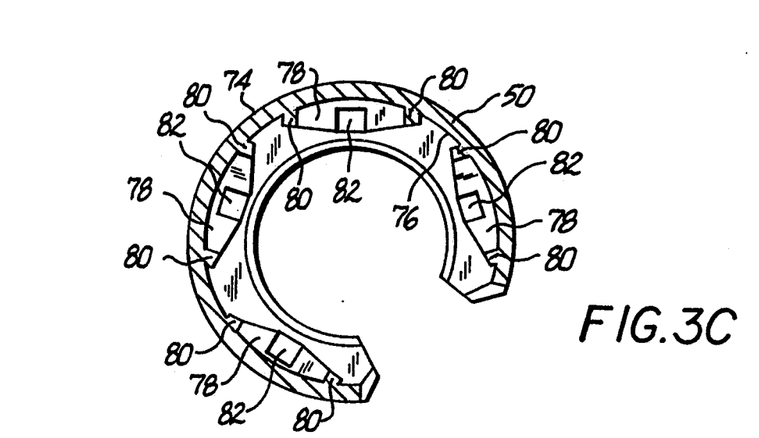
FIG. 3C is a cross-sectional view taken along line 3C—3C in FIG. 3B of the sleeve portion of FIG. 3A.

In this embodiment of the present invention, mounting surfaces 78 are configured to fit the shape of individual ball retainer segments 54. A plurality of locking bores 82 are formed in respective ends of sleeves 48, 50 in alignment with locking clips 72 of ball retainer segments 54. Thus, when the ball retainer segments 54 are assembled into the sleeves 48, 50, locking clip 72 extends into respective locking bores 82 and assists in holding linear motion bearing assembly 40 together.

Figures 4, 5, 6:
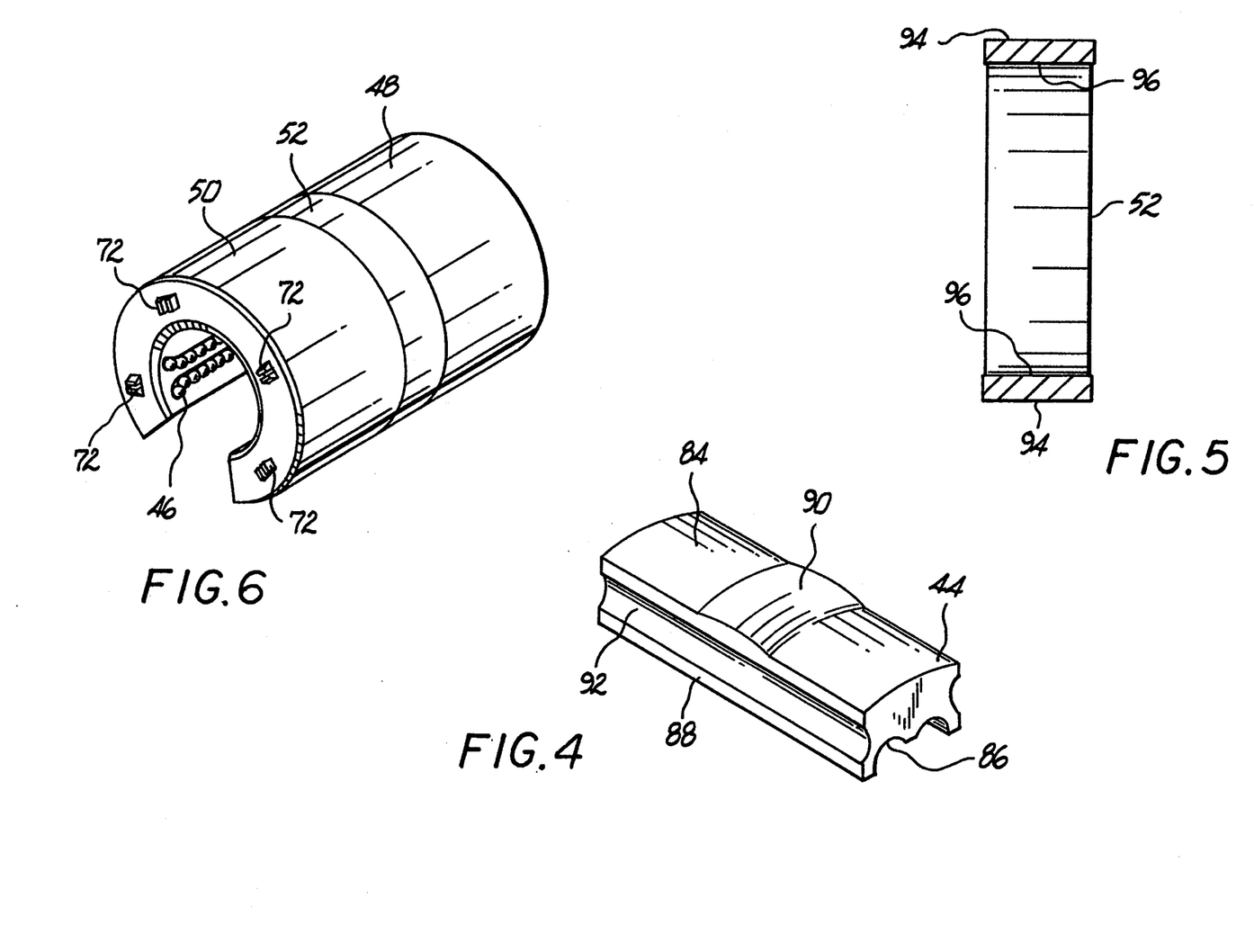
FIG. 4 is a perspective view of the load bearing plate in accordance with the linear motion bearing assembly of FIG. 1.
FIG. 5 is a cross-sectional view of the plate retainer ring taken along line 5—5 of FIG. 1.
FIG. 6 is a perspective view of the assembled linear motion bearing assembly of FIG. 1.

Referring now to FIGS. 1 and 4, a plurality of individual load bearing plates 44 are incorporated into the linear motion bearing assembly 40 and serve to receive load from the bearing balls 46 in contact with shaft 70. In the embodiment of FIG. 4, load bearing plate 44 is elongated along the longitudinal axis of the bearing assembly and includes an outer radial surface 84, an inner radial surface 86, and a pair of side wall surfaces 88. The outer radial surface 84 is substantially arcuate and, in a preferred embodiment, includes a crown portion 90 disposed on the outer radial surface 84 in a medial position. Crown portion 90 is configured and dimensioned to permit the load bearing plates to rock both circumferentially and longitudinally into and out of parallelism with the axes of the ball retainer 42.

The inner radial surface 86 of the load bearing plate of this embodiment is advantageously provided with a pair of axial grooves which serve as the upper surface of load bearing portions 62 of ball tracks 60. By providing a single load bearing plate 44 for each pair of load bearing portions 62 in each outer radial surface 56, the linear motion bearing assembly 40 is easier to fabricate and assemble. Further, the bearing assembly has a high load bearing capacity.

In this embodiment of the present invention, a longitudinal groove 92 is formed in each side wall surface 88 of load bearing plates 44. These grooves 92 make up a side wall of the axial ball tracks 60 and guide bearing balls 46 as they move through the return portion thereof.

Referring now to FIGS. 1, 5 and 6, plate retaining structure 52 is illustrated in a C-ring configuration having an outer radial surface 94 conforming substantially in dimension to the outer radial surface 74 of sleeves 48, 50. In this embodiment of the invention, the inner radial surface 96 is substantially parallel to the outer radial surface and is configured and dimensioned, when assembled, to contact crown portion 90 of load bearing plates 44. The radius of curvature of the crown portion 90 in the transverse direction is preferably smaller than the radius of curvature of the inner radial surface of the plate retainer structure 52. This configuration allows the plates to rock circumferentially with respect to the inner surface of the plate retainer structure 52.

Further, referring to FIGS. 1 and 6, the plate retaining structure 52 encompasses and engages extension portions 80 of sleeve 48, 50 to assist in enclosing and protecting ball retainer structure 42. Although shown in a narrow width, it is contemplated that the plate retaining structure 52 may extend substantially the entire longitudinal length of the bearing assembly. The plate retaining structure is preferably formed of a hard abrasion resistant material such as, for example, stainless steel or ceramic. Alternatively, a softer material such as bronze or aluminum may also be used.

When the inner radial surface 96 is positioned in contact with the crown portion 90 of the load bearing plates 44, this structure acts as the primary conduit for load from the load bearing plates and transmits that load directly to the carriage (not shown) into which the bearing assembly is mounted. This configuration permits sleeves 48, 50 to be relieved from primary load bearing responsibility and can thus be fabricated from less expensive and lighter engineering plastics such as, for example, acetal or nylon. This arrangement of elements also facilitates ease of manufacture and assembly resulting in an inexpensive, highly efficient, high load capacity bearing assembly.

It is also envisioned that various seals and/or wiper structure will be incorporated into the bearing assembly to inhibit the ingress of dust, dirt or other contaminants. See, for example, U.S. Pat. No. 3,545,826 to Magee et al., the disclosure of which is incorporated herein by reference.

FIGS. 7–11 illustrate a second preferred embodiment of a linear motion bearing assembly, shown generally at 98, in accordance with the present invention. Although shown as a closed-type bearing assembly, one skilled in the art will readily appreciate that the features of this bearing assembly are equally applicable to open-type bearing assemblies. The linear motion bearing assembly 98 includes a monolithic ball plate retainer structure 100, load bearing plates 102, bearing balls 104, outer housing sleeves 106, 108 and retainer structure 110.

Figure 7:
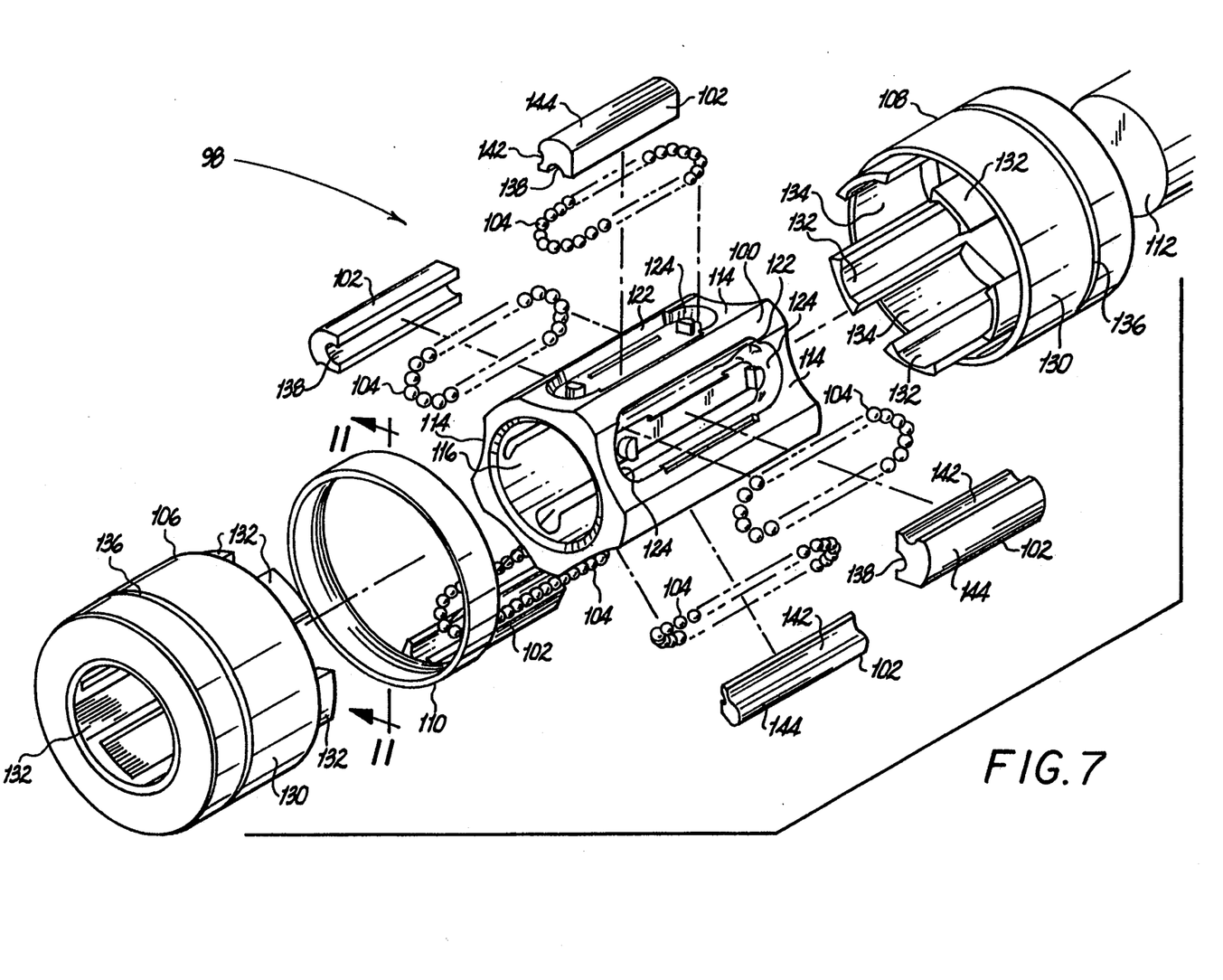
FIG. 7 is an exploded perspective view of a linear motion bearing assembly in accordance with another embodiment of the present invention.
Figures 8, 9A, 9B, 9C:
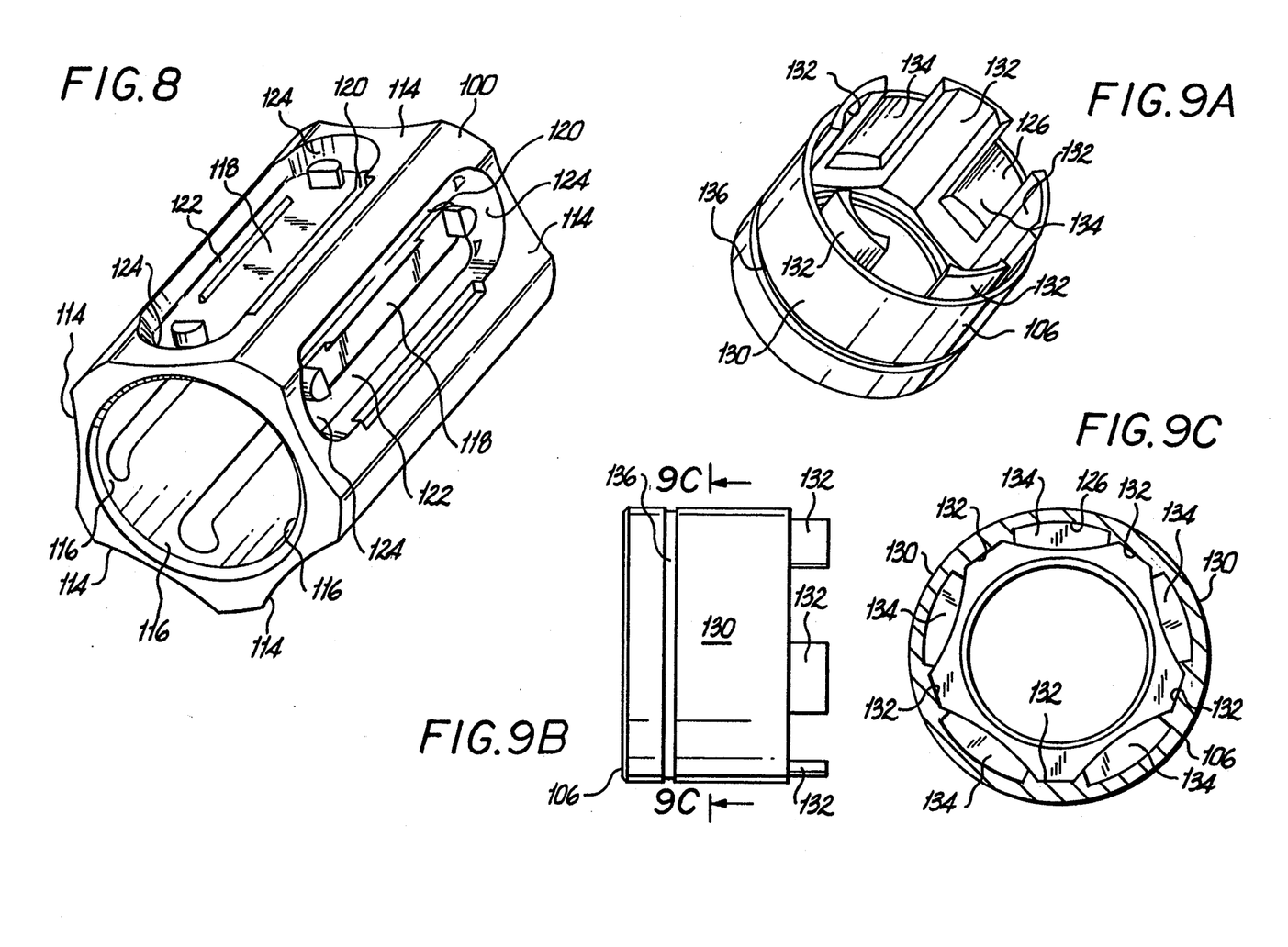
FIG. 8 is a perspective view of a monolithic ball retainer segment in accordance with the linear motion bearing assembly of FIG. 7.
FIG. 9A is a perspective view of the sleeve portion of the outer housing of the linear motion bearing assembly of FIG. 7.
FIG. 9B is a side view of the sleeve portion of FIG. 9A.
FIG. 9C is a cross-sectional view taken along line 9C—9C of FIG. 9B of the sleeve portion of FIG. 9A.

Referring now to FIGS. 7–8, the ball retainer structure 100 in accordance with the present invention comprises a monolithic structure having a pentagonal cross-section and defining an axial bore therethrough configured and dimensioned to receive shaft 112. The ball retainer structure 100 includes five planar faces, each having an outer radial surface 114 and an inner radial surface 116. A single axial ball track 118 is formed in each of the five faces. Each ball track 118 includes a load bearing portion 120, a return portion 122 and a pair of turnarounds 124. The outer radial surface 114 is preferably shaped to conform to the inner radial surface 126 of outer housing sleeves 106, 108. A longitudinal channel 128 extends through the inner radial surface 116 of the load bearing portion 120 to permit bearing balls 104 therein access to shaft 112. Both the load bearing portions 120 and the return portions 122 of the ball tracks of this embodiment of the present invention are substantially open to facilitate loading of the bearing balls 104 therein.

FIGS. 7 and 9A–C show the outer housing sleeves 106, 108 in accordance with this embodiment of the present invention. As in the previously described embodiment, it is preferable that both sleeves be identical to facilitate manufacture and assembly. Sleeves 106, 108 include an inner radial surface 126 and an outer radial surface 130. Because axial ball tracks 118 are open, as opposed to undercut, upper ball track housing structure 132 is formed in the inner radial surface 126 of sleeves 106, 108. This upper ball track housing structure 132 forms an outer radial portion of the ball tracks and serves to better guide bearing balls 104 between load beating and return portions, 120 and 122 respectively. Upper ball track housing structure 132 preferably extends axially beyond sleeves 106, 102 and is recessed from the outer radial surface 130 thereof to permit emplacement of plate retaining structure 110 discussed in detail below.

In this embodiment, cavities 134 are formed between said upper ball track housing structures 132 and configured and dimensioned to receive at least an outer radial portion of the load bearing plates 102. As in the previous embodiment, preferably each sleeve 106, 108 is monolithically formed from an engineering plastic to facilitate ease of manufacture and assembly. Where desirable, an annular groove 136 may be formed in the outer radial surface 130 of the sleeves 106, 108 to assist in mounting in carriage structure. Other known methods of mounting the bearing assembly in a carriage structure are also contemplated and include, for example, bolts, clips, pins, etc.

Figures 10, 11, 12:
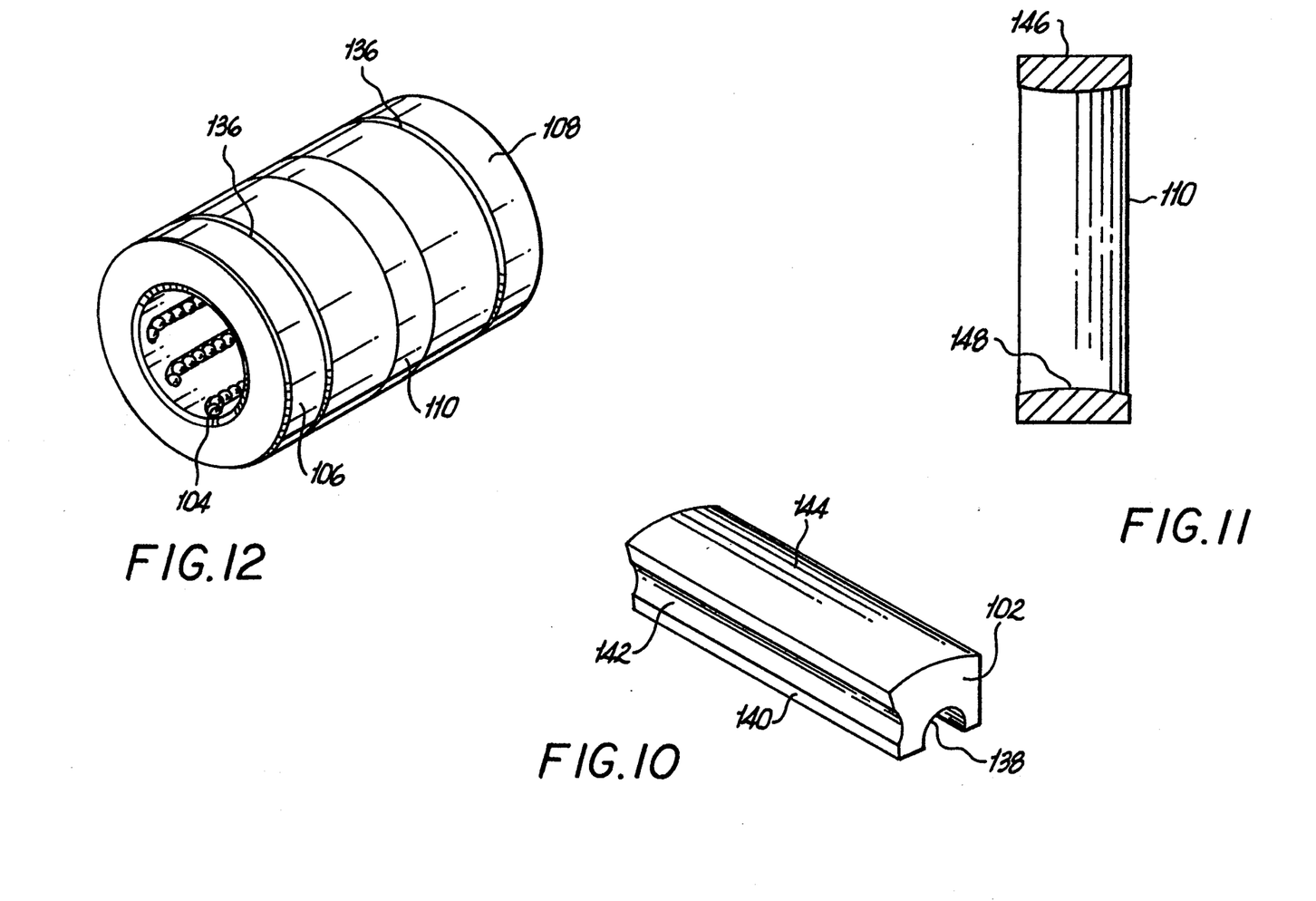
FIG. 10 is a perspective view of tile load bearing plate in accordance with the linear motion bearing assembly of FIG. 7.
FIG. 11 is a cross-sectional view of the plate retainer ring taken along line 11—11 of FIG. 7.
FIG. 12 is a perspective view of the assembled linear motion bearing assembly of FIG. 7.

Referring now to FIGS. 7 and 10, load bearing plates 102 in accordance with this embodiment of the present invention are positionable between ball retainer 100 and outer housing sleeves 106, 108 in cavities 134. These load bearing plates 102 include a single longitudinal groove 138 formed on an inner radial surface thereof for contacting and guiding bearing balls 104 in the load bearing portions 120 of ball tracks 118. A side wall 140 of the load bearing plate 102 also includes a longitudinal groove 142 for guiding the bearing balls 104 in the return portion 122 of the ball tracks 118. The outer radial surface 144 of the load bearing plate 102 has a substantially smooth arcuate configuration to facilitate both axial and circumferential self alignment as will be described in greater detail hereinbelow.

Plate retaining structure 110 is illustrated in FIGS. 7, 11 and 12, and is shown as a generally closed ring configuration having an outer radial surface 146 conforming substantially in dimension to the outer radial surface 130 of sleeves 106, 108. The inner radial surface 148 is substantially convex when viewed in cross-section (FIG. 11) relative to the outer radial surface 146. This inner radial surface 148 is configured and dimensioned to contact tile arcuate outer radial surface 144 of load bearing plates 102 when the linear motion bearing is assembled. The radius of curvature of the arcuate outer radial surface 144 of the load bearing plates 102 is preferably smaller than the radius of curvature of the inner radial surface 148 of the plate retainer structure 110. This configurature results in a contact between the arcuate outer radial surface 144 and the inner radial surface 148. This point-to-point contact permits both circumferential and axial self alignment of the bearing assembly when positioned on the shaft 112. The width of the plate retainer structure 110 is dimensioned to encompass and engage the portions of housing structure 132 extending from sleeves 106, 108 to assist in enclosing and protecting the exposed portion of ball retainer structure 110. As in the previous embodiment, the plate retainer structure 100 is preferably formed of a hard abrasion resistant material. This facilitates the transfer of load from the load bearing plates directly to the carriage without the need for a heavy cast or forged outer housing.

To the extent not already indicated, it also will be understood by those of ordinary skill in the art that any one of the various specific embodiments herein described and illustrated may be further modified to incorporate features shown in the other specific embodiments.

The invention in its broader aspects therefore is not limited to the specific embodiments herein shown and described but departures may be made therefrom within the scope of tile accompanying claims without departing from the principles of the invention and without sacrificing its chief advantages.

I claim:

1. A linear motion bearing assembly for movement along a shaft comprising:

ball retainer structure having at least a portion of a plurality of axial ball tracks formed therein, said ball tracks including a load bearing portion, a return portion and turnarounds interconnecting said load bearing and return portions;

a plurality of bearing balls disposed in said ball tracks;

an outer housing including a pair of sleeves for enclosing substantially all of an exposed exterior surface of said ball retainer structure, said sleeves being formed of an engineering plastic;

a plurality of load bearing plates axially positioned within said outer housing for receiving load from said balls disposed in said load bearing portion of the ball tracks; and plate retainer means disposed at least partially around a medial portion of said ball retainer structure for maintaining said plurality of load bearing plates in position and for receiving load from said load bearing plates.

2. A linear motion bearing assembly as in claim 1 wherein said ball retainer structure is monolithically formed.

3. A linear motion bearing assembly as in claim 2 wherein said axial ball tracks are completely formed in said ball retainer structure.

4. A linear motion bearing assembly as in claim 1 wherein said load bearing plates are received in said ball retainer.

5. A linear motion bearing assembly as in claim 1 wherein said load bearing plates include self aligning structure.

6. A linear motion bearing assembly as in claim 5 wherein said plate retainer means is a plate retainer ring dimensioned and positioned to engage said self-aligning structure of said load bearing plates.

7. A linear motion bearing assembly as in claim 5 wherein said load bearing plates are both circumferentially and axially self-aligning.

8. A linear motion bearing assembly as in claim 1 wherein said bearing assembly is an open-type bearing assembly.

9. A linear motion bearing assembly as in claim 8 wherein said open-type bearing assembly includes a ball retainer having four longitudinal faces.

10. A linear motion bearing assembly as in claim 9 wherein a plurality of complete ball tracks are formed in each of said longitudinal faces.

11. A linear motion bearing assembly as in claim 10 wherein said load bearing plates include a plurality of axial grooves formed on an underside thereof.

12. A linear motion bearing assembly as in claim 10 wherein said ball retainer structure is monolithically formed.

13. A linear motion bearing assembly as in claim 1 wherein said plate retainer means comprises a plate retainer ring.

14. A linear motion bearing assembly as in claim 1 wherein said plate retainer means is formed of an engineering metal.

15. A linear motion bearing assembly as in claim 1 further comprising joining means for joining said pair to sleeves together.

16. A linear motion bearing assembly for movement along a shaft comprising:

ball retainer structure having a plurality of complete axial ball tracks formed therein, said ball tracks each including a load bearing portion, a return portion and a pair of turnarounds interconnecting said load bearing and return portions;

a plurality of bearing balls disposed in said ball tracks;

a plurality of self-aligning axial load bearing plates each having at least one axial ball groove formed on an inner radial surface thereof, said load bearing plates being at least partially supported by said ball retainer structure for receiving load from said balls disposed in said load bearing portion of the ball tracks;

an outer housing including a pair of sleeves for enclosing substantially all of an exposed exterior surface of said ball retainer structure; and at least one plate retainer ring configured and dimensioned to extend substantially circumferentially around a medial portion of said ball retainer structure for engaging and maintaining said plurality of load bearing plates in self-aligning position and for receiving and transmitting load from said load bearing plates.

17. A linear motion bearing assembly as in claim 16 wherein said ball retainer structure is monolithically formed.

18. A linear motion bearing assembly as in claim 16 wherein said bearing assembly is an open-type bearing assembly.

19. A linear motion bearing assembly as in claim 18 wherein said open-type bearing assembly includes a ball retainer having a pentagonal cross-section defining five longitudinal faces.

20. A linear motion bearing assembly as in claim 19 wherein a plurality of complete ball tracks are formed in each of said longitudinal faces.

21. A linear motion bearing assembly as in claim 20 wherein said load bearing plates include a plurality of axial grooves formed on an underside thereof.

22. A linear motion bearing assembly as in claim 16 wherein said load bearing plates are both circumferentially and axially self-aligning.

* * * * *